US006805994B1

(12) United States Patent
Shibamoto

(10) Patent No.: US 6,805,994 B1
(45) Date of Patent: Oct. 19, 2004

(54) SOLID ELECTROLYTE CELL HAVING A ROLLED ELECTROLYTE BODY

(75) Inventor: Goro Shibamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/675,386

(22) Filed: Sep. 29, 2000

(30) Foreign Application Priority Data

Sep. 30, 1999 (JP) ............................................ 11-279789

(51) Int. Cl.⁷ .......................... H01M 4/04; H01M 4/70; H01M 6/10; H01M 10/04
(52) U.S. Cl. .......................... 429/94; 429/120; 429/169
(58) Field of Search ........................... 429/94, 120, 169

(56) References Cited

U.S. PATENT DOCUMENTS

| | | | | |
|---|---|---|---|---|
| 4,287,274 A | * | 9/1981 | Ibbotson ..................... | 429/156 |
| 4,565,752 A | | 1/1986 | Goebel et al. ................ | 429/94 |
| 5,368,953 A | * | 11/1994 | Zaborney ..................... | 429/90 |
| 5,478,668 A | | 12/1995 | Gozdz et al. ............... | 429/127 |
| 6,001,505 A | * | 12/1999 | Fukuda ........................ | 429/176 |
| 6,270,874 B1 | * | 8/2001 | Iwashita ...................... | 429/98 |
| 6,325,611 B1 | * | 12/2001 | Iwasaki ....................... | 429/164 |
| 6,337,153 B1 | * | 1/2002 | Kodama ...................... | 429/163 |
| 6,451,479 B1 | * | 9/2002 | Kim ............................ | 429/163 |

FOREIGN PATENT DOCUMENTS

| | | | | |
|---|---|---|---|---|
| EP | 0357399 | | 3/1990 | |
| EP | 0409616 | | 1/1991 | |
| EP | 936 690 | * | 8/1999 | .......... H01M/10/04 |
| GB | 590466 | | 5/1994 | |
| JP | 07057763 | | 3/1995 | |
| JP | 10315389 A | * | 12/1998 | .......... B32B/15/08 |
| WO | WO 97/03475 | | 1/1997 | |

* cited by examiner

Primary Examiner—Mark Ruthkosky
(74) Attorney, Agent, or Firm—Sonnenschein, Nath & Rosenthal

(57) ABSTRACT

A positive electrode has a strip electrode collector whose both sides are coated with a positive electrode active material layer and a negative electrode has a strip negative electrode collector whose both sides are coated with a negative electrode active material layer. The positive electrode and the negative electrode are layered via a solid electrolyte layer and rolled in the longitudinal direction into a rolled electrode body of a cell. The electrodes have a collector one-side exposed portion at their one end in the longitudinal direction to be positioned at the outermost circumference and the collector one-side exposed portion covers the outer circumference of the rolled electrode body by one more. This configuration can minimize a damage which may be caused when the cell is pushed to be collapsed.

4 Claims, 7 Drawing Sheets

SOLID ELECTROLYTE CELL HAVING A ROLLED ELECTROLYTE BODY

RELATED APPLICATION DATA

The present application claims priority to Japanese Application No. JP 11-279,789 filed Sep. 30, 1999, which application is incorporated herein by reference to the extent permitted by law.

BACKGROUND OF THE INVENTION

1. Field of the Invention

The present invention relates to a solid electrolyte cell including a rolled electrode body having a strip positive electrode and a strip negative electrode which are layered via a solid electrolyte layer and rolled in the longitudinal direction.

2. Description of the Prior Arts

Recently, electronic apparatuses are reducing their sizes so as to be portable and improving their performances. In response to this, the cell as an energy storage source should also be reduced in size and have a higher capacity. A special attention is paid on a lithium-ion secondary cell having a high operation voltage and a high energy density. The current lithium-ion secondary cell uses a non-aqueous electrolytic solution, which causes a problem of leak of the electrolytic solution. In order to solve this problem, a study has been made on cells using a gel electrolyte and a solid electrolyte. These cells have no problem of leak of the electrolyte and have an advantage that the cells can be made thin and are flexible and now widely applied to small-size portable apparatuses.

A conventional thin-type cell has been produced as follows. A strip positive electrode, a separator, a strip negative electrode are layered into a layered body, which is rolled into a rolled electrode body. After this, an electrode terminal is attached to the positive electrode and the negative electrode and the rolled electrode body is wrapped in a plastic film laminate member by heat sealing at several position of the laminate member or vacuum sealing, so as to obtain a thin-type cell.

However, in the conventional solid electrolyte cell, when the cell is pushed by an external pressure, short circuit may be caused between the positive electrode and the negative electrode in the cell, which in turn causes a heat and smoke, deteriorating the entire cell. Moreover, the existing cell uses a strip electrode having no exposure of electrode collector and when this electrode is rolled, the outermost circumference also has the electrode active material layer which is not used, thus causing a loss in volume energy density.

SUMMARY OF THE INVENTION

It is therefore an object of the present invention to provide a solid electrolyte cell capable of suppressing a damage caused when the cell is pushed and broken.

The solid electrolyte cell according to the present invention includes a rolled electrode body consisting of a positive electrode having a strip electrode collector whose both sides are coated with a positive electrode active material layer and a negative electrode having a strip negative electrode collector whose both sides are coated with a negative electrode active material layer. The positive electrode and the negative electrode are layered via a solid electrolyte layer and rolled in the longitudinal direction. The rolled electrodes have a collector one-side exposed portion at their one end in the longitudinal direction to be positioned at the outermost circumference and the collector one-side exposed portion covers the outer circumference of the rolled electrode body by one turn one more.

In the solid electrolyte cell having the aforementioned configuration according to the present invention, one end of the electrodes to be positioned at the outermost circumference has a collector one-side exposed portion, which covers the outer circumference of the rolled electrode body by one turn or more. Accordingly, even if the cell is pushed to be collapsed and shot-circuit is caused between the positive electrode and the negative electrode, at the early stage, the collector exposed portion diffuses the heat caused by the short-circuit, causing almost no affect to the electrode active material layer and not damaging the entire cell.

DETAILED DESCRIPTION OF PREFERRED EMBODIMENTS

Description will now be directed to preferred embodiments of the present invention.

Figure 1:
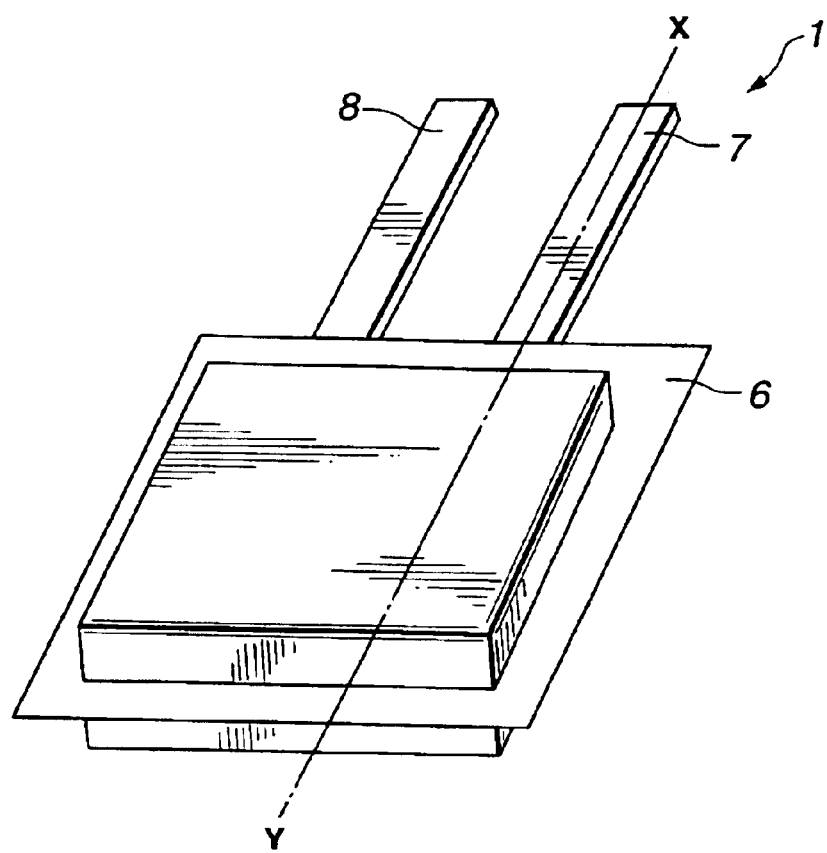
FIG. 1 is a perspective view showing a configuration example of a gel electrolyte cell according to the present invention.
Figure 2:
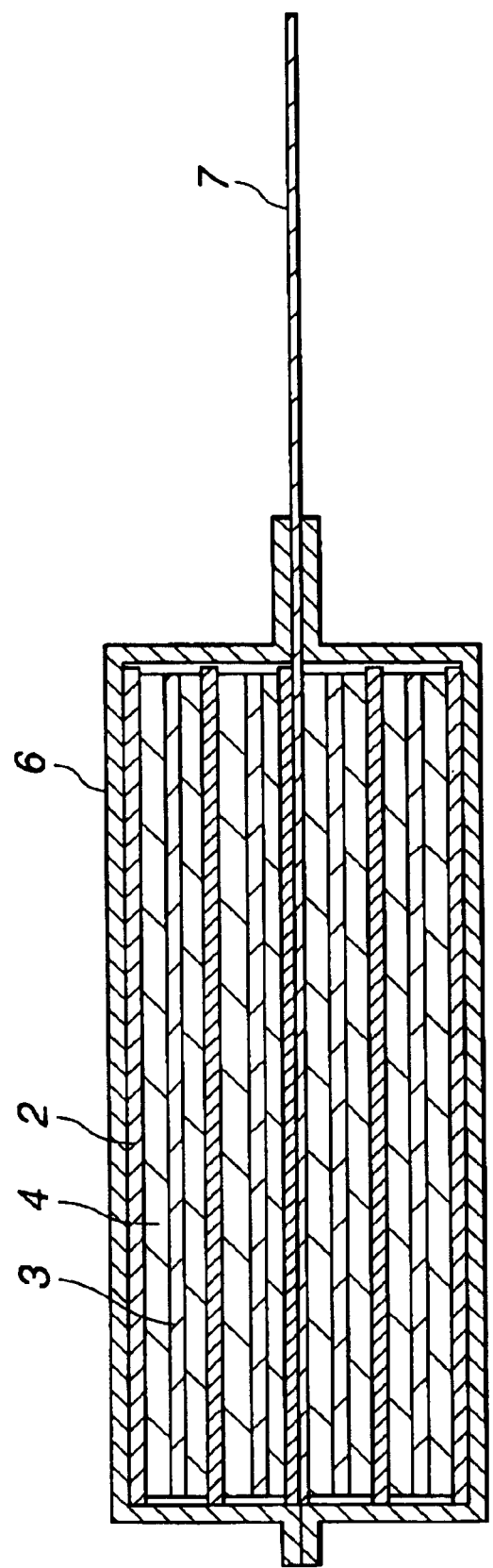
FIG. 2 is a cross sectional view of the gel electrolyte cell shown in FIG. 1 about the line X-Y.
Figure 3:
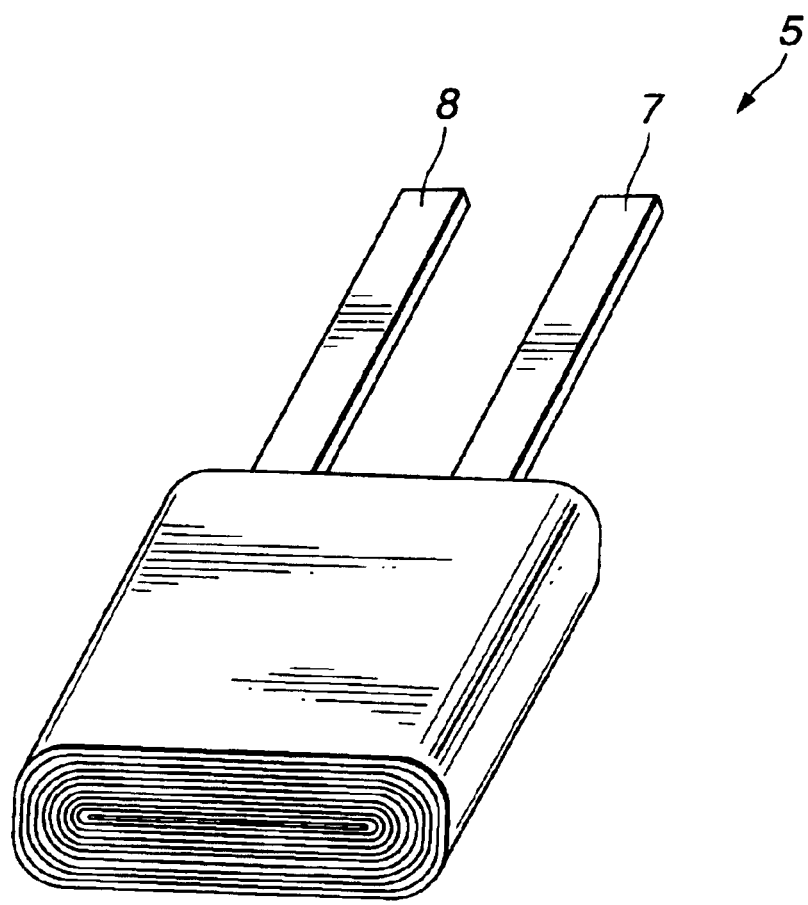
FIG. 3 is a perspective view showing a rolled electrode body used in the gel electrolyte cell shown in FIG. 1.

FIG. 1 and FIG. 2 show a configuration example of a gel electrolyte cell according to an embodiment of the present invention. The gel electrolyte cell 1 includes a strip positive electrode 2, a strip negative electrode 3 arranged to oppose to the positive electrode 2, and a gel electrolyte layer 4 arranged between the positive electrode 2 and the negative electrode 3. The gel electrode cell 1 is prepared as follows. The positive electrode and the negative electrode 3 are layered via the gel electrolyte layer 4 and rolled in the longitudinal direction to form a rolled electrode body 5 shown in FIG. 3, which is covered by a casing film 6 made from an insulating material and sealed. A positive electrode terminal 7 is connected to the positive electrode 2, and a negative electrode terminal 8 is connected to the negative electrode 3. The positive electrode terminal 7 and the negative electrode terminal 8 are inserted into a sealing portion which is a peripheral portion of the casing film 6.

Figure 4:
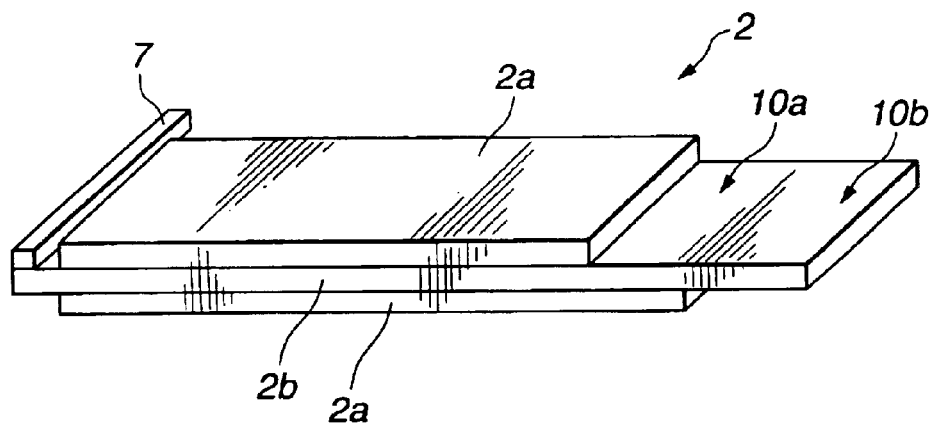
FIG. 4 is a perspective view schematically showing a positive electrode used in the gel electrolyte cell shown in FIG. 1.

As shown in FIG. 4, the positive electrode 2 includes positive electrode active material layer 2a formed on both sides of the positive electrode collector 2b, which is, for example, a metal foil such as an aluminum foil.

The positive electrode active material layer 2a is prepared as follows. Firstly, a positive electrode material, a conductive material, and a binder are uniformly mixed to obtain a positive electrode composite agent. This positive electrode composite agent is dispersed in a solvent into a slurry. Next, this slurry is uniformly applied onto the positive electrode collector 2b using the doctor blade method or the like and dried at a high temperature to eliminate the solvent. Here, the positive electrode active material, the conductive material, the binder, and the solvent need be uniformly dispersed and their mixing ratio is not limited to a particular one.

Here, as the positive electrode active material, it is possible to use a composite oxide of lithium and a transition metal such as $LiCoO_2$, $LiNjO_2$, and $LiMn_2O_4$. One or more than one transition metal elements can be used in combination such as $LiNi_{0.5}Co_{0.5}O_2$.

Moreover, the conductive material may be, for example, a carbon material, Moreover, the binder may be, for example, polyvinylidene fluoride. Moreover, the solvent may be, for example, N-methylpyrrolidone.

As shown in FIG. 4, the positive electrode 2 has a positive electrode collector one-side exposed portion 10a where the positive electrode active material layer 2a is formed only on one side of the positive electrode collector 2b, leaving the other side exposed.

Figure 5:
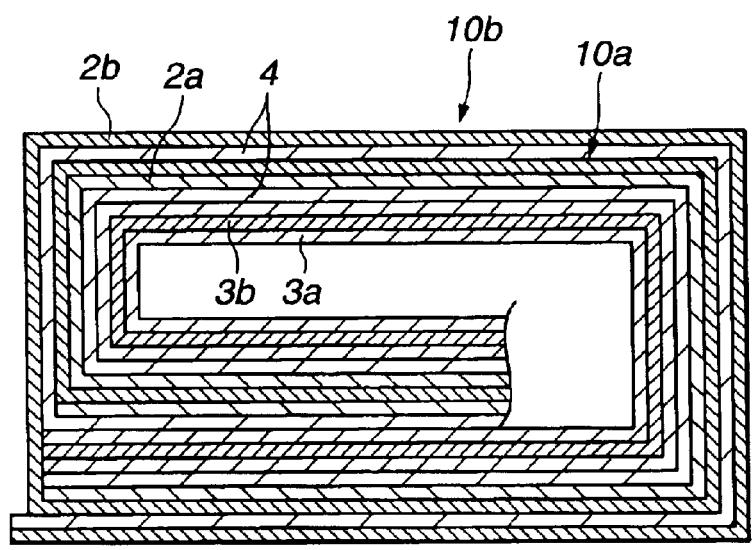
FIG. 5 is a cross sectional view schematically showing a rolling end portion of the rolled electrode body shown in FIG. 3.

This positive electrode collector one-side exposed portion 10a is positioned at an outer circumference when the rolled electrode body 5 is prepared. As shown in FIG. 5, this positive electrode collector one-side exposed portion 10a covers the outermost one circumference of the rolled electrode body 5. In this outermost circumference of the rolled electrode body 5, no negative electrode 3 is arranged to face the positive electrode collector one-side exposed portion 10a. Only the positive electrode collector one-side exposed portion 10a covers the outermost circumference of the rolled electrode body 5.

Furthermore, the end portion of the rolled electrode body 5 adjacent to the positive electrode collector one-side exposed portion 10a is a positive electrode collector both-side exposed portion 10b having no positive electrode active material layer 2a on the both sides of the positive electrode collector 2b. As shown in FIG. 5, this positive electrode collector both-side exposed portion 10b covers the positive electrode one-side exposed portion 10a as the further outermost circumference of the rolled electrode body 5. In the explanation below, the aforementioned positive electrode collector one-side exposed portion 10a and the positive electrode collector both-side exposed portion 10b will be referred to merely as the positive electrode exposed portion 10.

Moreover, the positive electrode 2 has the positive electrode terminal 7 connected to the other end in the longitudinal direction by the spot welding or the ultrasonic welding. This positive electrode terminal 7 is preferably a metal foil in a network shape. However, the positive electrode terminal 7 may be made from a material other than a metal if it is stable electro-chemically and chemically and electrically conductive. The positive electrode terminal 7 may be made from, for example, copper, nickel, aluminum, and the like.

The positive electrode terminal 7 preferably protrudes in the same direction as the negative electrode terminal 8 but may protrude in any direction if no short-circuit is caused and if no problem is caused in the cell performance.

Moreover, the positive electrode terminal 7 may be attached to a position other than the aforementioned if electrical contact is assured.

Figure 6:
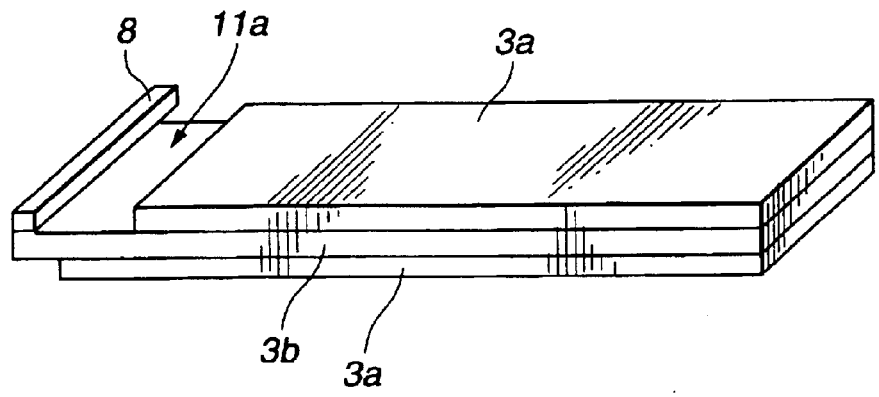
FIG. 6 is a perspective view schematically showing a negative electrode used in the gel electrolyte cell shown in FIG. 1.

Moreover, as shown in FIG. 6, the negative electrode 3 includes a negative electrode active material layer 3a containing a negative electrode active material formed on both side of the negative electrode collector 3b. The negative electrode collector 3b is, for example, a metal foil such as a copper foil.

The negative electrode active material layer 3a is prepared as follows. Firstly, a negative electrode active material, a conductive material, and a binder are uniformly mixed to obtain a negative electrode composite agent. This negative electrode composite agent is dispersed in a solvent to obtain a slurry. This slurry is uniformly applied onto the negative electrode collector by the doctor blade method or the like and dried at a high temperature to eliminate the solvent. Here, the negative electrode active material, the conductive material, the binder, and the solvent need be uniformly dispersed and their mixing ratio is not limited to a particular one.

The negative electrode active material may be a material capable of doping/dedoping lithium. More specifically, the negative electrode active material may be graphite, non-graphitizable carbon, graphitizable carbon, and the like.

Moreover, the conductive material may be, for example, a carbon material. Moreover, the binder may be, for example, polyvinylidene fluoride. Moreover, the solvent may be, for example, N-methylpyrrolidone.

As shown in FIG. 6, the negative electrode 3 has a negative electrode collector one-side exposed portion 11a at one end in the longitudinal direction of the negative electrode 3 where the negative electrode active material layer 3a is formed only on one side of the negative electrode collector 3b, leaving the other side exposed. The end portion having this negative electrode collector one-side exposed portion 11a is positioned inside the rolled electrode body 5.

Figure 7:
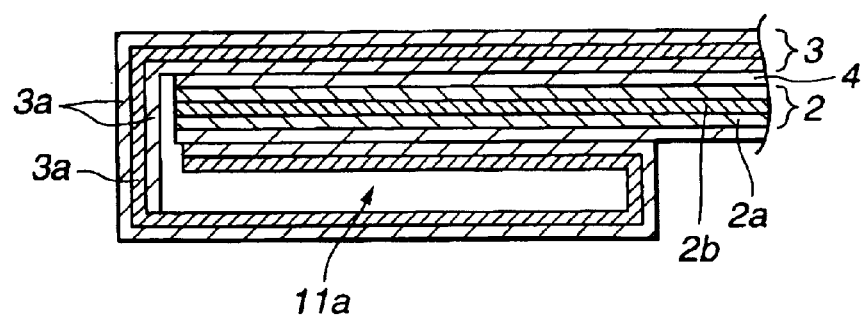
FIG. 7 is a cross sectional view schematically showing a rolling start portion of the rolled electrode body shown in FIG. 3.

The reason why the negative electrode 3 has no negative electrode active material layer 3a at one end is that folding in is performed initially when rolling the electrode as shown in FIG. 7. In the folded in portion, the negative electrode active material layer 3a is a non-reaction portion. Accordingly, when the negative electrode active material layer 3a is formed, this brings about a loss in the volume energy density.

Moreover, the negative electrode 3 as a negative electrode terminal 8 connected to one end in the longitudinal direction of the negative electrode 3 by the spot welding or ultrasonic welding. This negative electrode terminal 8 is preferably a metal foil in a network shaped but may be other than a metal if it is stable electro-chemically and chemically and electrically conductive. The negative electrode terminal 8 may be made from, for example, copper, nickel, aluminum, and the like.

The negative electrode terminal 8 preferably protrudes in the same direction as the positive electrode terminal 7 but may protrude in any direction if no short-circuit is caused and no problem is caused in the cell performance. Moreover, the negative electrode terminal 8 may be connected to a position other than the aforementioned if electrical contact is assured.

The gel electrolyte contains a non-aqueous solvent, electrolyte salt, and matrix polymer.

The non-aqueous solvent may be a known solvent used as a non-aqueous solvent of the non-aqueous electrolyte. One such solvent may be used or more than one such solvents may be used in combination. Among them, a preferable solvent contains one more than one cyclic ester compounds such as ethylene carbonate, propylene carbonate, γ-butyrolactone, and the like.

As the electrolyte salt, it is possible to use materials which can be solved in the aforementioned non-aqueous solvent. The cation may be lithium and other alkali metal ion, and alkaline earth metal ion. Moreover, the anion may be $Cl^-$, $Br^-$, $I^-$, $SCN^-$, $ClO_4^-$, $BF_4^-$, $PF_6^-$, $CF_3SO_3^-$, $(CF_3SO_2)_2N^-$, and the like. The electrolyte salt obtained by combination of these cation and anion is used. The electrolyte salt used is, for example, $LiPF^6$ and $LiBF_4$.

It should be noted that the electrolyte salt concentration may be any if it can be solved in the aforementioned solvent.

The matrix polymer gelates the electrolytic solution containing the aforementioned electrolyte salt solved in the aforementioned non-aqueous solvent. The matrix polymer may be, for example, polyvinylidene fluoride, polyvinylidene fluoride—hexafluoropropylene copolymer, polyvinylidene fluoride—tetrafluoropropylene copolymer, polyacrylonitrile, polyacrylonitrile—vinyl acetate copolymer, polyacrylonitrile—butadiene copolymer, polyacrylonitrile—styrene copolymer, polymethyl methacrylate, polyethylene oxide, polyethylene oxide—propylene oxide copolymer, and the like. Each of these polymers may be used solely or in combination with the others.

The casing film 6 airtightly covers the rolled electrode body 5 in which the positive electrode 2 and the negative electrode 3 are layered via the electrolyte layer 4. This casing film is, for example, a damp-proof insulating multilayered film having a polyethylene terephthalate layer, an aluminum layer, a polyethylene terephthalate layer, and a strait chain low density polyethylene layer which are layered in this order.

Here, the heat sealing polymer film is the straight chain low density polyethylene layer, which is positioned inside when the cell is sealed. It should be noted that the heat sealing polymer film may be made from polyethylene terephthalate, nylon, straight chain low density polyethylene, polypropylene, high-density polyethylene, and their copolymers.

The casing film 6 may have a configuration other than the aforementioned if it includes at least one aluminum layer in the multiple layers, and a heat sealing polymer film at the outermost surface, and is capable of maintaining damp-proof and insulation characteristics.

In the conventional solid electrolyte cell, heat and smoke are caused when the cell is pushed and broken. It is considered that when the rolled electrode body is pushed and short-circuit is caused between the positive electrode and the negative electrode in the cell, this causes a heat, which in turn causes a reaction, causing smoke.

In the gel electrolyte cell 1 having the aforementioned configuration according to the present invention, the end portion of the electrode which is positioned at the outermost circumference is the positive electrode collector exposed portion 10, which covers more than one turn of the outer circumference of the rolled electrode body 5. Accordingly, even if the cell is pushed and broken to short-circuit between the positive electrode 2 and the negative electrode 3, at the initial stage, the positive electrode collector exposed portion 10 diffluses the heat caused by the short-circuit, causing almost no affect to the electrode active material layer and not damaging the entire cell.

Furthermore, in the gel electrolyte cell 1, the positive electrode collector one-side exposed portion 10a is covered from outside by the positive electrode collector both-side exposed portion 10b. Accordingly, the heat is diffused further effectively, enabling to further enhance the reliability.

Next, explanation will be given on the production method of the gel electrolyte cell 1.

Firstly, the positive electrode 2 is prepared as follows. The positive electrode composite agent containing the positive electrode active material, the conductive material, and the binder is uniformly applied onto a metal foil such as an aluminum foil serving as the positive electrode collector 2b and dried to form the positive electrode active material layer 2a. Thus, a positive electrode sheet is complete. The binder of the positive electrode composite agent may be a known binder, or an additive can be added to the aforementioned positive electrode composite agent.

When the positive electrode composite agent is applied to the positive electrode collector 2b, as shown in FIG. 4, no positive electrode composite agent is applied to one side of an end portion of the positive electrode collector 2b, so as to serve as the positive electrode collector one-side exposed portion 10a. When the rolled electrode body 5 is prepared, the positive electrode collector one-side exposed portion 10a is positioned on the outer circumference of the rolled electrode body 5.

Furthermore, this positive electrode collector one-side exposed portion 10a has one end where no positive electrode composite agent is applied to either side. This end is defined as the positive electrode collector both-side exposed portion 10b. When the rolled electrode body 5 is prepared, this positive electrode collector both-side exposed portion 10b is positioned at the outer circumference of the rolled electrode body 5.

Next, the gel electrolyte layer 4 is formed on the positive electrode sheet. In order to form the gel electrolyte layer 4, firstly, an electrolyte salt is solved in a non-aqueous solvent to prepare a non-aqueous electrolytic solution. A matrix polymer is added to this non-aqueous electrolytic solution and agitated sufficiently to solve the matrix polymer to obtain a sol electrolytic solution.

Next, a predetermined amount of this electrolytic solution is applied to the positive electrode sheet and cooled at the room temperature so that the matrix polymer is gelated and the gel electrolyte layer 4 is formed on the positive electrode active material 2a and the positive electrode collector exposed portion 10.

Next, the positive electrode sheet having the gel electrolyte layer 4 is cut into a strip. The positive electrode active material layer 2a is removed from the gel electrolyte layer 4 where the positive electrode lead is to be welded, and an aluminum lead, for example, is welded to this portion so as to serve as the positive electrode terminal 7. Thus, a strip positive electrode 2 having the gel electrolyte layer 4 is complete.

Moreover, the negative electrode 3 is prepared as follows. The negative electrode composite agent containing the negative electrode active material, the conductive material, and the binder is uniformly applied onto a metal foil such as a copper foil serving as the negative electrode collector 3b and dried to form the negative electrode active material layer 3a. Thus, a negative electrode sheet is complete. The binder of the negative electrode composite agent may be a known binder, or an additive can be added to the aforementioned negative electrode composite agent.

When the negative electrode composite agent is applied to the negative electrode collector 3b, as shown in FIG. 6, no negative electrode composite agent is applied to one side of an end portion of the negative electrode collector 3b, so as to serve as the negative electrode collector one-side exposed portion 11a. When the rolled electrode body 5 is prepared, the negative electrode collector one-side exposed portion 11a is positioned on the inner circumference of the rolled electrode body 5.

Next, the gel electrolyte layer 4 is formed on the negative electrode sheet. In order to form the gel electrolyte layer 4, firstly, a predetermined amount of the electrolytic solution prepared in the same way as the aforementioned is applied to the negative electrode active material layer 3a and cooled at the room temperature so that the matrix polymer is gelated and the gel electrolyte layer 4 is formed on the negative electrode active material 3a and the negative electrode collector one-side exposed portion 11a.

Next, the negative electrode sheet having the gel electrolyte layer 4 is cut into a strip. The negative electrode active material layer 3a is removed from the gel electrolyte layer 4 where the negative electrode lead is to be welded, and a nickel lead, for example, is welded to this portion so as to serve as the negative electrode terminal 8. Thus, a strip negative electrode 3 having the gel electrolyte layer 4 is complete.

The strip positive electrode 2 and the strip negative electrode 3 thus prepared are attached to each other in such a manner that the gel electrolyte layers 4 oppose to each other and are pressed to obtain a layered electrode body. Furthermore, this layered electrode body is rolled in the longitudinal direction to obtain the rolled electrode body 5. Here, as shown in FIG. 5, the positive electrode collector one-side exposed portion 10a covers the outer circumference of the rolled electrode body 5 by one turn or more. Furthermore, the positive electrode collector both-side exposed portion 10b covers the positive electrode collector one-side exposed portion 10a by one turn or more.

Lastly, this rolled electrode body 5 is packed in a casing film 6 made from an insulating material and the positive electrode terminal 7 and the negative electrode terminal 8 are inserted into the sealing portion, thus completing the gel electrolyte cell 1.

Figure 8:
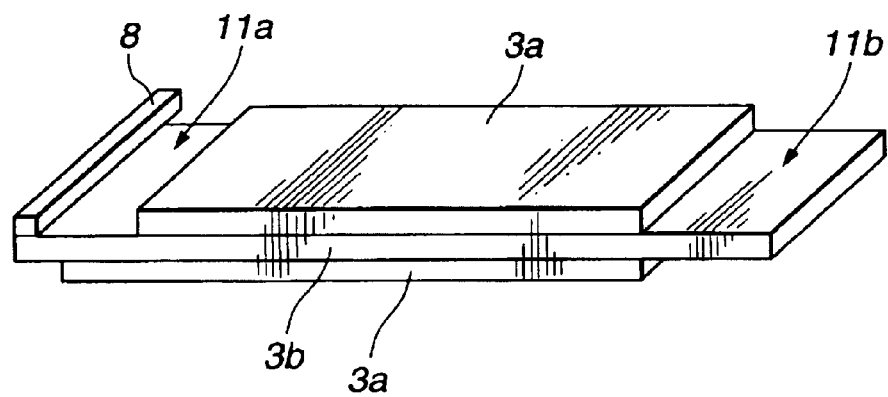
FIG. 8 is a perspective view schematically showing another configuration example of the negative electrode.
Figure 9:
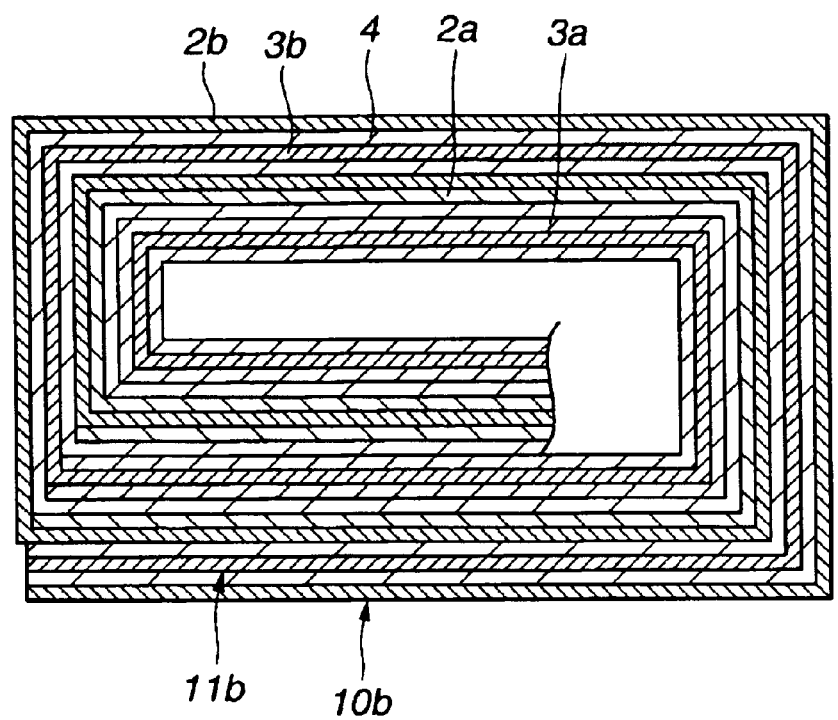
FIG. 9 is a cross sectional view schematically showing a rolling end portion-of the rolled electrode body using the negative electrode shown in FIG. 8.

It should be noted that in the gel electrolyte cell 1 according to the present embodiment, as shown in FIG. 8, the negative electrode 3 may have a negative electrode collector both-side exposed portion 11b at the other end in the longitudinal direction. The end portion having this negative electrode collector both-side exposed portion 11b is positioned at the outer circumference of the rolled electrode body 5. As shown in FIG. 9, this negative electrode collector both-side exposed portion 11b is sandwiched between the positive electrode collector one-side exposed portion 10a and the positive electrode both-side exposed portion 10b when rolled.

In the aforementioned gel electrolyte cell 1, the electrode end portion positioned on the outermost circumference has a collector exposed portion, which covers the outer circumference of the rolled electrode body 5 by one turn or more. Accordingly, even if the cell is pushed and collapsed, firstly short-circuit is caused between the positive electrode collector exposed portion 10 and the negative electrode collector both-side exposed portion 11b. In this gel electrolyte cell 1, the positive electrode collector exposed portion 10 and the negative electrode collector both-side exposed portion 11b diffuses the heat generated by short-circuit and the heat has almost no affect to the electrode active material layer. Thus, no damage is caused in the entire cell.

The aforementioned gel electrolyte cell 1 according to the present embodiment may have a cylindrical shape, angular shape, and the like and is not limited to a particular shape. Moreover, the gel electrolyte cell 1 may be a thin-type or large-size type and is not limited to a particular size.

It should be noted that the aforementioned embodiment has been explained on the gel electrolyte cell 1 containing a swelling solvent and using a gel solid electrolyte, but the present invention is not to be limited to this. The present invention can also be applied to a solid electrolyte cell not containing a swelling solvent. Moreover, the present invention can also be applied to a secondary cell.

EXAMPLES

A solid electrolyte cell having the aforementioned configuration was actually produced to confirm the effects of the present invention through a collapse test.

Example 1

Firstly, a positive electrode was prepared as follows.

Firstly, 0.5 mol of lithium carbonate and 1 mol of cobalt carbonate were mixed and sintered in the air at 900° C. for 5 hours to obtain $LiCoO_2$ to be used as a positive electrode active material. 91 weight parts of this $LiCoO_2$, 6weight parts of graphite as the conductive material, and 3 weight parts of polyvinylidene fluoride as the binder were mixed and dispersed in N-methylpyrrolidone into a slurry state. This slurry was uniformly applied to both sides of a positive electrode collector made from an aluminum foil having a thickness of 20 $\mu$m and dried to form a positive electrode active material layer.

When the positive electrode composite agent was applied to the positive electrode collector, one side of an end portion of the positive electrode collector was left un-coated so as to serve as the positive electrode collector one-side exposed portion, which is positioned at an outer circumference when the electrode is rolled into a rolled electrode body. The positive electrode composite agent applied to the positive electrode collector was dried and pressed by a roll press to obtain a positive electrode sheet.

A gel electrolyte layer was formed on the positive electrode sheet as follows. Firstly, 42.5 weight parts of ethylene carbonate, 42.5 weight parts of propylene carbonate, and 15 weight parts of $LiPF_6$ were mixed to obtain a plastic agent. 30 weight parts of this plastic agent as the matrix polymer, 10 weight parts of vinylidene fluoride and hexafluoropropylene copolymerized with a polymerization ratio of 97:3, and 60 weight parts tetrahydrofuran were mixed and solved to obtain a sol electrolytic solution.

Next, the electrolytic solution was uniformly applied to the positive electrode sheet and dried to eliminate tetrahydrofuran. Next, the positive electrode was turned back and the electrolytic solution was applied onto the other side of the positive electrode and dried. Thus, a gel electrolyte layer having a thickness of 12.5 $\mu$m was formed on the both sides of the positive electrode sheet.

The positive electrode sheet having the gel electrolyte layers was cut into a strip. The gel electrolyte layer and the positive electrode active material layer were removed from a lead welding portion and an aluminum lead was welded to that portion to serve as a positive electrode terminal. Thus, the positive electrode was complete.

The positive electrode thus obtained has at its one end in the longitudinal direction the positive electrode collector one-side exposed portion where the other surface of the positive electrode collector is exposed. This end having the positive electrode collector one-side exposed portion is positioned at an outer circumference when a rolled electrode body is formed.

Next, a negative electrode was prepared as follows.

Firstly, 90 weight parts of graphite and 10 weight parts of polyvinylidene fluoride were mixed and dispersed in N-methylpyrrolidone to obtain a slurry. This slurry was uniformly applied to both sides of a negative electrode collector made from a copper foil having a thickness of 10 μm and dried to form a negative electrode active material layer. After dried, the negative electrode collector having the negative electrode active material layer was pressed by a roll press into a negative electrode sheet.

Next, a gel electrolyte layer was formed on the negative electrode sheet as follows. The electrolytic solution prepared in the same was as the aforementioned was uniformly applied to both sides of the negative electrode sheet and dried to eliminate tetrahydrofuran. Thus, a gel electrolyte layer having a thickness of 12.5 μm was formed on the both sides of the negative electrode sheet.

The negative electrode sheet having the gel electrolyte layers was cut into a strip. The gel electrolyte layer and the negative electrode active material layer were removed from a lead welding portion and a nickel lead was welded to that portion to serve as a negative electrode terminal. Thus, the negative electrode was complete.

Next, the strip positive electrode having the gel electrolyte layer on its both sides and the strip negative electrode having the gel electrolyte layer on its both sides were layered into a layered body. The layered body was rolled in the longitudinal direction in such a manner that the positive electrode is at an outer position and the negative electrode is in an inner position, so as to obtain a rolled electrode body. Here, the positive electrode collector one-side exposed portion covers the outer circumference of the rolled electrode body by one turn or more.

Lastly, the rolled electrode body is sandwiched between casing films consisting of a nylon layer of 25 μm thickness, an aluminum layer of 40 μm thickness, and a polypropylene layer of 30 μm thickness layered in this order from the outside. The peripheral ends of the casing film were heat sealed under a reduced pressure so as to seal the rolled electrode body in the casing film airtightly. It should be noted that the positive electrode terminal and the negative electrode terminal were inserted in the film sealing portion. Thus, the gel electrolyte cell was complete.

Example 2

In Example 2, a positive electrode was prepared as follows.

Firstly, a positive electrode composite agent slurry was prepared in the same way as Example 1, and this slurry was uniformly applied to both sides of a positive electrode collector made from an aluminum foil having a thickness of 20 μm and dried to form a positive electrode active material layer.

When the positive electrode composite agent was applied to the positive electrode collector, one side of an end portion of the positive electrode collector was left un-coated so as to serve as the positive electrode collector one-side exposed portion. This positive electrode collector one-side exposed portion is to be positioned at an outer circumference when the electrode is rolled into a rolled electrode body. Furthermore, adjacent to this positive electrode collector one-side exposed portion, there was arranged a positive electrode collector both-side exposed portion where no positive electrode composite agent was applied to either sides. This positive electrode collector both-side exposed portion is to be positioned at an outer circumference when a rolled electrode body is prepared. The positive electrode collector having the positive electrode composite agent layers was dried and pressed by a roll press to obtain a positive electrode sheet.

Next, a gel electrolyte layer was formed on the positive electrode sheet as follows. The electrolytic solution prepared in the same way as Example 1 was uniformly applied to both sides of the positive electrode sheet and dried to eliminate tetrahydrofuran. Thus, a gel electrolyte layer having a thickness of 12.5 μm was formed on the both sides of the positive electrode sheet.

The positive electrode sheet having the gel electrolyte layers was cut into a strip. The gel electrolyte layer and the positive electrode active material layer were removed from a lead welding portion and an aluminum lead was welded to that portion to serve as a positive electrode terminal. Thus, the positive electrode was complete.

The positive electrode thus obtained has at its one end in the longitudinal direction the positive electrode collector one-side exposed portion where the other surface of the positive electrode collector is exposed. This end having the positive electrode collector one-side exposed portion is positioned at an outer circumference when a rolled electrode body is formed. Furthermore, the end portion of the positive electrode collector one-side exposed portion to be positioned at an outer circumference when rolled is a positive electrode collector both-side exposed portion where the both sides of the positive electrode collector are exposed. The positive electrode collector both-side exposed portion covers the positive electrode collector one-side exposed portion by one turn or more.

A gel electrolyte cell was completed in the same way as Example 1 except for that the positive electrode prepared as the aforementioned was used.

In the rolled electrode body of the gel electrolyte cell, the positive electrode collector one-side exposed portion covers the outer circumference of the rolled electrode body by one turn or more, which is further covered by the positive electrode collector both-side exposed portion by one turn or more.

Example 3

In Example 3, a negative electrode was prepared as follows.

Firstly, a negative electrode composite agent slurry was prepared in the same way as Example 1, and this negative electrode composite slurry was uniformly applied to both sides of a negative electrode collector and dried to form a negative electrode active material layer.

When the negative electrode composite agent was applied to the negative electrode collector, one side of an end portion of the negative electrode collector was left un-coated so as to serve as the negative electrode collector one-side exposed portion. This negative electrode collector one-side exposed portion is to be positioned at an inner circumference when the electrode is rolled into a rolled electrode body. The negative electrode collector having the negative electrode composite agent layers was dried and pressed by a roll press to obtain a negative electrode sheet.

Next, a gel electrolyte layer was formed on the negative electrode sheet as follows. The electrolytic solution prepared in the same way as Example 1 was uniformly applied to both sides of the negative electrode sheet and dried to eliminate tetrahydrofuran. Thus, a gel electrolyte layer having a thickness of 12.5 μm was formed on the negative electrode sheet.

The negative electrode sheet having the gel electrolyte layers was cut into a strip. The gel electrolyte layer and the negative electrode active material layer were removed from a lead welding portion and a nickel lead was welded to that portion to serve as a negative electrode terminal. Thus, the negative electrode was complete.

The negative electrode thus obtained has at its one end in the longitudinal direction the negative electrode collector one-side exposed portion where the other surface of the negative electrode collector is exposed. This end having the negative electrode collector one-side exposed portion is positioned at an inner circumference when a rolled electrode body is formed.

A gel electrolyte cell was completed in the same way as Example 1 except for that the negative electrode prepared as the aforementioned was used.

In the rolled electrode body of the gel electrolyte cell, the negative electrode collector one-side exposed portion covers the inner circumference of the rolled electrode body by one turn or more.

Example 4

In Example 4, a positive electrode and a negative electrode were prepared as follows.

Firstly, a positive electrode composite agent slurry was prepared in the same way as Example 1, and this slurry was uniformly applied to both sides of a positive electrode collector and dried to form a positive electrode active material layer.

When the positive electrode composite agent was applied to the positive electrode collector, there was arranged a positive electrode collector both-side exposed portion where no positive electrode composite agent was applied to either sides. This positive electrode collector both-side exposed portion is to be positioned at an outer circumference when a rolled electrode body is prepared. The positive electrode collector having the positive electrode composite agent layers was dried and pressed by a roll press to obtain a positive electrode sheet.

Next, a gel electrolyte layer was formed on the positive electrode sheet as follows. The electrolytic solution prepared in the same way as Example 1 was uniformly applied to both sides of the positive electrode sheet and dried to eliminate tetrahydrofuran. Thus, a gel electrolyte layer having a thickness of 12.5 μm was formed on the positive electrode sheet.

The positive electrode sheet having the gel electrolyte layers was cut into a strip. The gel electrolyte layer and the positive electrode active material layer were removed from a lead welding portion and an aluminum lead was welded to that portion to serve as a positive electrode terminal. Thus, the positive electrode was complete.

The positive electrode thus obtained has at its one end in the longitudinal direction the positive electrode collector both-side exposed portion where the both sides of the positive electrode collector are exposed. This end having the positive electrode collector both-side exposed portion is positioned at an outer circumference when a rolled electrode body is formed.

Next, a negative electrode was prepared as follows.

Firstly, a negative electrode composite agent slurry was prepared in the same way as Example 1, and this negative electrode composite slurry was uniformly applied to both sides of a negative electrode collector and dried to form a negative electrode active material layer.

When the negative electrode composite agent was applied to the negative electrode collector, both side of an end portion of the negative electrode collector ware left un-coated so as to serve as the negative electrode collector both-side exposed portion. This negative electrode collector both-side exposed portion is to be positioned at an outer circumference when the electrode is rolled into a rolled electrode body. The negative electrode collector having the negative electrode composite agent layers was dried and pressed by a roll press to obtain a negative electrode sheet.

Next, a gel electrolyte layer was formed on the negative electrode sheet as follows. The electrolytic solution prepared in the same way as Example 1 was uniformly applied to both sides of the negative electrode sheet and dried to eliminate tetrahydrofuran. Thus, a gel electrolyte layer having a thickness of 12.5 μm was formed on the negative electrode sheet.

The negative electrode sheet having the gel electrolyte layers was cut into a strip. The gel electrolyte layer and the negative electrode active material layer were removed from a lead welding portion and a nickel lead was welded to that portion to serve as a negative electrode terminal. Thus, the negative electrode was complete.

The negative electrode thus obtained has at its one end in the longitudinal direction the negative electrode collector both-side exposed portion where the both surfaces of the negative electrode collector are exposed. This end having the negative electrode collector both-side exposed portion is positioned at an outer circumference when a rolled electrode body is formed.

A gel electrolyte cell was completed in the same way as Example 1 using the positive electrode and the negative electrode thus prepared.

In the rolled electrode body of the gel electrolyte cell, the positive electrode collector both-side exposed portion and the negative electrode collector both-side exposed portion cover the outer circumference of the rolled electrode body via gel electrolyte layer by one turn or more.

Comparative Example

A gel electrolyte cell was prepared in the same way as Example 1 except for that the entire positive electrode collector was coated by the positive electrode composite agent without leaving no un-coated portion and the entire negative electrode collector was coated by the negative electrode composite agent without leaving no un-coated portion.

The gel electrolyte cells thus prepared were subjected to a collapse test. It should be noted that the gel electrolyte cells obtained had energy density of 250 Wh/l.

Firstly, each of the cells is charged up to 4.2 V with a constant current under the 0.2C current condition and then discharged with a constant voltage and cut at a predetermined current value.

Each of the charged cells was placed on a heat insulating material and subjected to an external force to short-circuit the cell. The maximum temperature of the casing film surface was measured.

The collapse test was performed for 5 samples per each example and the average value of the maximum temperature of the casing film surface in the 5 samples was calculated. The results are shown in Table 1.

TABLE 1

| | Max. temperature of casing film (° C.) |
|---|---|
| Example 1 | 110 |
| Example 2 | 90 |
| Example 3 | 75 |
| Example 4 | 105 |
| Comparative Example | 140 |

As is clear from Table 1, in the cells of Examples 1 to 4 having the electrode collector exposed portion, the maximum temperature of the casing film at collapse is suppressed to a low temperature as compared to the cell of Comparative example 1.

This can be explained as follows. When a cell is collapsed by a pressure, in the beginning, short-circuit is caused in the electrode collector exposed portion at the outermost circumference of the rolled electrode body, which diffuses the heat generated, enabling to suppress the affect to the electrode active material layer to a minimum degree.

As has been described above, in the solid electrolyte cell according to the present invention, when the cell is pushed to be collapsed, initially, a short-circuit is caused in the electrode collector exposed portion, diffusing the heat, and accordingly, the electrode active material layer is hardly affected. Thus, it is possible to suppress heat generation and smoke generation.

Moreover, in the non-aqueous electrolyte cell according to the present invention, the electrode collector exposed portion covers the outer circumference of the rolled electrode body by one turn or more. Accordingly, it is possible to suppress generation of heat and smoke when the cell is pushed to be collapsed.

Consequently, the present invention can realize a solid electrolyte cell capable of suppressing a cell damage and affect to the environment and having an excellent reliability.

What is claimed is:

1. A solid electrolyte cell comprising:
    a rolled electrode body having:
        a positive electrode having a strip positive electrode collector having a first side and a second side opposite the first side, the first and second sides of the strip positive electrode collector are coated with a positive electrode active material layer, and
        a negative electrode having a strip negative electrode collector having a first side and a second side opposite the first side, the first and second sides of the strip negative electrode collector are coated with a negative electrode active material layer, which positive electrode and negative electrode are layered via a solid electrolyte layer and rolled in a lengthwise direction,
    wherein said positive and negative electrodes each have a collector first-side exposed portion at their one end in the lengthwise direction positioned at an outermost circumference of the rolled electrode body, where at least the first side of the strip positive electrode collector and at least the first side of the strip negative electrode collector are exposed, and the collector first-side exposed portion of the positive electrode covers the outer circumference of said rolled electrode body by one turn or more;
    wherein said positive electrode has a collector inner first-side exposed portion at an end of the positive electrode opposite the collector first-side exposed portion in the lengthwise direction of the positive electrode, the collector inner first-side exposed portion of the positive electrode being at an innermost circumference of the rolled electrode body; and
    wherein the negative electrode has a collector inner first-side exposed portion at an end of the negative electrode opposite the first-side exposed portion in the lengthwise direction of the negative electrode, the collector inner first-side exposed portion of the negative electrode being at an innermost circumference of the rolled electrode body, the collector first-side exposed portions of the positive and negative electrodes covering the inner circumference of the rolled electrode body by one turn or more; and
    a multi-layered cell casing film covering the rolled electrode body, the multi-layered cell casing film comprising a polyethylene terephthalate layer.

2. The solid electrolyte cell as claimed in claim 1, wherein said solid electrolyte layer contains a swelling solvent and is a gel.

3. The solid electrolyte cell as claimed in claim 1, wherein said collector first-side exposed portion of said positive electrode has a collector both-side exposed portion where the first and second sides of the strip positive electrode collector are exposed,
    wherein said collector first-side exposed portion of said negative electrode has a collector both-side exposed portion where the first and second sides of the strip negative electrode collector are exposed, and
    wherein said collector both-side exposed portion of said positive electrode covers an outer circumference of said collector first-side exposed portion of said positive electrode of said rolled electrode body by one turn or more.

4. The solid electrolyte cell as claimed in claim 1, wherein said collector first-side exposed portion of said positive electrode has a collector both-side exposed portion where the first and second sides of the strip positive electrode collector are exposed, and
    wherein said collector first-side exposed portion of said negative electrode has a collector both-side exposed portion where the first and second sides of the strip negative electrode collector are exposed,
    said positive electrode collector both-side exposed portion and said negative electrode collector both-side exposed portion, sandwiching the solid electrolyte layer, covering the outer circumference of said rolled electrode body by one turn or more.

* * * * *